United States Patent [19]

Norton

[11] Patent Number: 4,672,294

[45] Date of Patent: Jun. 9, 1987

[54] DUAL BATTERY SYSTEM WITH IMPROVED OVERVOLTAGE PROTECTION

[76] Inventor: Peter Norton, 2730 Narraganset, Lansing, Mich. 48910

[21] Appl. No.: 822,145

[22] Filed: Jan. 24, 1986

[51] Int. Cl.⁴ .............................................. H02J 7/00
[52] U.S. Cl. ......................................... 320/17; 320/6; 307/16
[58] Field of Search ..................... 320/17, 15, 16, 6, 7; 322/90, 94; 307/16

[56] References Cited

U.S. PATENT DOCUMENTS

| | | | |
|---|---|---|---|
| 3,710,226 | 1/1973 | Seike | 320/15 |
| 3,809,995 | 5/1974 | Hardin | 320/17 X |
| 3,816,805 | 6/1974 | Terry | 320/15 |
| 4,041,363 | 8/1977 | Scheidler | 320/17 X |
| 4,044,293 | 8/1977 | Follmer | 320/15 |
| 4,047,088 | 9/1977 | Himmler | 320/6 |
| 4,179,647 | 12/1979 | Cummins et al. | 320/17 X |
| 4,210,856 | 7/1980 | Taylor | 320/17 |

Primary Examiner—Patrick R. Salce
Assistant Examiner—Anita M. Ault
Attorney, Agent, or Firm—Reising, Ethington, Barnard, Perry & Milton

[57] ABSTRACT

A dual voltage, dual battery electrical supply system for automotive vehicles is disclosed. Two batteries are connected in series and a high voltage regulator regulates the voltage across the series connected batteries and a low voltage regulator regulates the voltage across the lower battery of the series connection. Overvoltage protection is provided for the lower battery by a control circuit which resets the high voltage regulator to a reduced voltage in response to a predetermined voltage across the lower battery.

7 Claims, 1 Drawing Figure

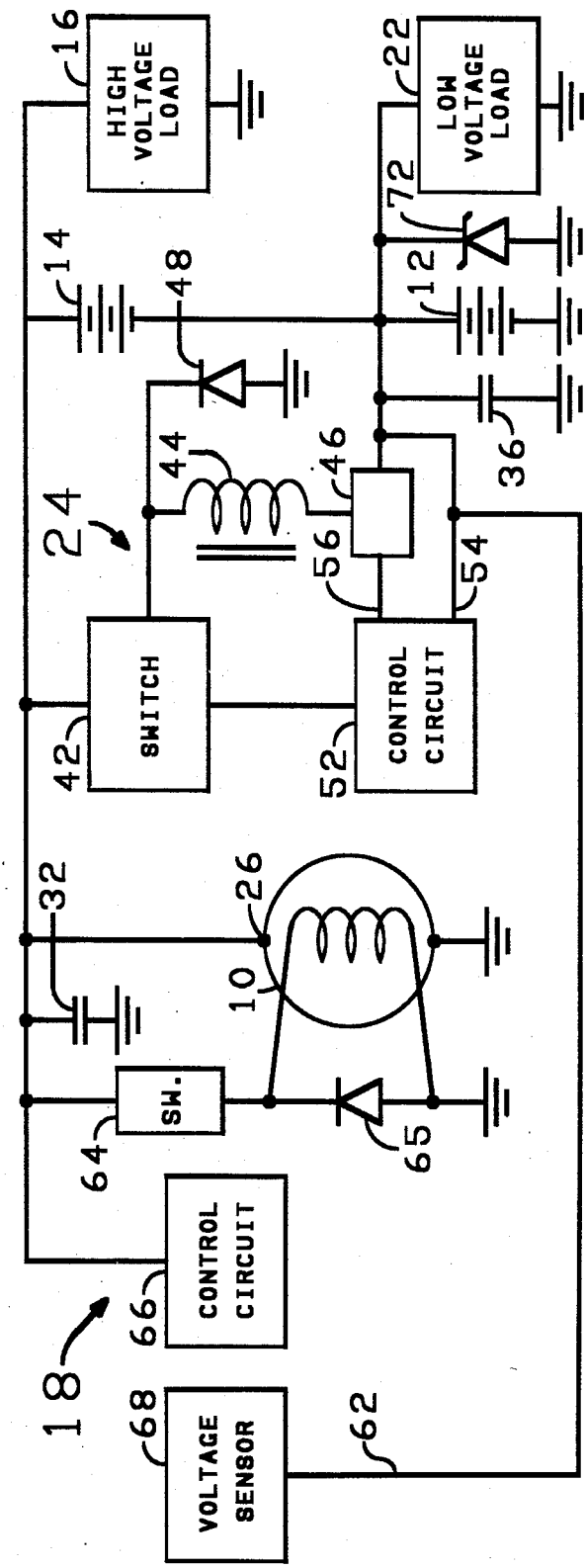

DUAL BATTERY SYSTEM WITH IMPROVED OVERVOLTAGE PROTECTION

FIELD OF THE INVENTION

This invention relates to an electrical system for automotive vehicles; more particularly it relates to overvoltage protection for a dual battery system.

BACKGROUND OF THE INVENTION

The typical electrical power supply system for automotive vehicles is a so-called constant voltage system having a normal rated voltage of twelve volts. It comprises a single storage battery, a generator and a regulator to maintain the generator output voltage and current within certain limits. The generator, which typically takes the form of an alternator with a rectifier, is driven at variable speed by the vehicle engine and supplies the DC power to the load circuits and charges the battery. The regulator is typically a switching system for the field coil of the alternator across the battery to regulate the generator output voltage to the desired value and to limit the generator current to a desired value.

Dual battery systems are also known for use in automotive vehicles. Such systems are useful in vehicles which have different load devices adapted to be energized at two different voltages. For example, the system may comprise two batteries with a first load circuit including load devices designed to be powered at the rated voltage of one battery and a second load circuit including load devices designed to be powered at twice the rated voltage of one battery. Various arrangements have been proposed for charging the two batteries from the generator and for providing the dual voltage output to the load circuits. It is advantageous to connect the two batteries in series with the high voltage load circuit across the series batteries and the low voltage load circuit connected across the lower battery of the series combination. This requires appropriate charging circuits for the respective batteries; it also requires special overvoltage protection to prevent excessive voltage across the lower battery under certain circumstances such as a defective upper battery.

In the prior art, a dual voltage system with two batteries in series is disclosed in the Seike U.S. Pat. No. 3,710,226 granted Jan. 9, 1973. One of the batteries is charged by two cooperating phases of the alternator, the output of the two phases being controlled by a field regulator for the alternator. The other battery is charged by the third phase of the alternator, the third phase output being regulated by a series regulator.

In the Follmar U.S. Pat. No. 4,044,293 granted Aug. 23, 1977, a dual voltage system with two batteries is described in which the alternator charges the series combination of the batteries. A separate regulator is provided for one of the batteries and when it is fully charged the regulator is effective to bypass that battery out of the circuit so that the alternator is connected only with the first battery.

Another dual voltage, dual battery system is disclosed in the Himmler U.S. Pat. No. 4,047,088 granted Sept. 6, 1977. In the Himmler system, the output of a three phase alternator-rectifier is used to charge two twelve volt batteries which are connected in series across a twenty-four volt load circuit. One of the batteries, which is connected with a twelve volt load circuit, is charged by an auxiliary charging circuit connected across one of the phase windings of the alternator.

The Taylor U.S. Pat. No. 4,210,856 granted July 1, 1980, discloses a dual voltage system provided with two different batteries. One battery is charged from an alternator-rectifier and the two batteries in series are charged from a DC-to-DC converter energized from the first battery.

A general object of this invention is to provide a dual battery, dual voltage electrical system for automotive vehicles which overcomes certain disadvantages of the prior art.

SUMMARY OF THE INVENTION

In accordance with this invention, a dual voltage system is provided with two batteries connected in series with separate regulating means for high voltage and low voltage load circuits and with overvoltage protection for the lower battery of the series connection. This is accomplished by control means responsive to a predetermined voltage across the low voltage load circuit for decreasing the voltage across the high voltage load circuit. Further, according to the invention, a first regulating means is coupled with the generator output and the low voltage load circuit for regulating the voltage across the low voltage load circuit and a second regulating means controls the generator for regulating the voltage across the high voltage load circuit. Further, the control means is operative to control the second regulating means for reducing the voltage across the low voltage load circuit. Further, according to the invention, the first regulating means is a switching type regulator.

A more complete understanding of this invention may be obtained from the detailed description that follows taken with the accompanying drawings.

DESCRIPTION OF THE DRAWINGS

The single FIGURE of the drawings shows a schematic diagram of the invention.

BEST MODE FOR CARRYING OUT THE INVENTION

Referring now to the drawings, there is shown an illustrative embodiment of the invention in a dual voltage electrical system for automotive vehicles with two storage batteries connected in series. A switching regulator is utilized for the low voltage circuit across the lower battery and a generator field current regulator is utilized for regulating the high voltage across the series combination of batteries. It will be appreciated as the description proceeds that the invention may be implemented in different circuit arrangements.

As shown in the single FIGURE, the electrical system comprises, in general, a generator 10 driven at variable speed by the vehicle engine and a pair of storage batteries 12 and 14. The generator 10 supplies output voltage directly to a high voltage load circuit 16 across the series combination of batteries 12 and 14 and is controlled by a high voltage regulator 18. The low voltage load circuit 22 is connected across the lower battery 12 and is supplied with energizing voltage which is regulated by a regulator 24. The system will now be described in greater detail.

The generator 10 is suitably a conventional automotive alternator with rectifying diodes to supply a DC output voltage between ground and output 26. Both the batteries 12 and 14 are conventional twelve volt storage batteries and are connected in series between the output 26 of the generator and ground. The low voltage load circuit 22 suitably includes the conventional automotive accessories which are rated for twelve volts such as the lamps, horn and radio. The high voltage load circuit 16 suitably includes the higher power load devices such as the starter motor, fan motor and window heater.

The high voltage regulator 18 is a generator field current regulator of well known type. The regulator 18 is coupled with the field winding of the generator 10 and is responsive to the voltage at the output 26 for controlling the current through the field winding. The regulator 18 is adapted, in normal operation, to regulate the voltage at the output 26 to a voltage range corresponding to the rated voltage of the batteries 12 and 14 in series connection. The regulator 18 is suitably of the type disclosed in my copending application U.S. Ser. No. 569,723 filed Jan. 10, 1984 entitled "DUAL VOLTAGE POWER SUPPLY SYSTEM FOR VEHICLES". Many regulators are known for controlling the output of a conventional automotive generator and may be used in place of regulator 18. Regulator 18 will be described further after the description of the regulator 24.

A current storage capacitor 32 is connected between the output 26 of the generator and ground. Also, a storage capacitor 36 and a protective device, suitably a zener diode 72, are connected across the lower battery 12. Their purpose will be described subsequently.

The regulator 24 is a series switching regulator of well known type. It comprises in general, a solid state switch 42 and an inductor 44 connected in series with a current sensor 46 between the output 26 of the generator and the lower battery 12. A diode 48 is connected between the upper terminal of the inductor 44 and ground. The switch 42 is controlled by a control circuit 52 to operate with a duty cycle which is effective to regulate the voltage across the lower battery 12 at a voltage within a voltage range corresponding to the rated voltage of the battery and to limit the current to a predetermined value. For this purpose, the control circuit 52 receives a voltage signal on a conductor 54 which is connected with the upper terminal of the battery 12 and it receives a current signal on a conductor 56 which is connected with the current sensor 46.

With the batteries 12 and 14 connected in series, the lower battery 12 and the load devices in the low voltage load circuit 22 are susceptible to damage by reason of overvoltage. Such an overvoltage could occur, for example, upon failure due to short circuited plates in the upper battery 14. In such an event, the voltage at the output 26 of the generator, or a fraction thereof, would be applied directly to the lower battery 12. In order to prevent overvoltage on the battery 12 the high voltage regulator 18 is adapted to reduce the voltage at output 26 of the generator and hence the voltage at the upper terminal of upper battery 14 when the voltage at the upper terminal of lower battery 12 exceeds a predetermined value. The regulator 18 includes a control circuit 66 for setting the regulated voltage, i.e. the value at which the regulator 18 regulates. It also includes a switch 64 connected in series with the field winding of the generator 10. A voltage sensor 68 is coupled through a conductor 62 with the upper terminal of the lower battery 12 and is responsive to the voltage across the battery. When the battery voltage exceeds a predetermined value, the voltage sensor 68 causes control circuit 66 to maintain switch 64 in its nonconducting state. Voltage sensor 68 may be a part of control circuit 52. A diode 65 is connected across the field winding of the generator.

In operation of the system, the high voltage regulator 18 normally regulates the voltage at the output 26 of the generator 10 to a voltage in the voltage range corresponding to the sum of the rated voltages of batteries 12 and 14. The low voltage regulator 24 regulates the voltage across the lower battery 12 to a voltage in the voltage range corresponding to its rated voltage. The storage capacitor 32 is adpated to store a charge during the time interval when the switch 42 is open and to discharge when the switch is closed. Thus, the capacitor 32 and low voltage regulator 24 function in the manner of a DC-to-DC converter with output of higher current capacity and reduced voltage. Capacitor 36 across the lower battery 12 is effective to protect against momentary overvoltage as might result from a decrease in the load current resulting in an inductive voltage transient. In the event that the voltage across lower battery 12 becomes excessive for any reason, the excessive voltage will be sensed by voltage sensor 68 causing it to send a signal to control circuit 66 causing it to keep switch 64 turned off thereby causing the field current of alternator 26 to diminish and the output voltage to correspondingly diminish. The voltage across the series combination of batteries 14 and 12 will be regulated so that the voltage across battery 12 will not remain excessive. The zener diode 72 may be included to limit the overvoltage while the rotor current is decaying and to aid or replace capacitor 36.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. An electrical system for a vehicle, said system comprising:
    a DC generator having an output,
    first and second storage batteries each having a rated voltage connected in series with each other and adapted to be charged from the generator,
    a first load circuit including the first battery and a first load device in parallel and adapted to be powered by electricity at a voltage in a first voltage range corresponding to the rated voltage of the first battery,
    a second load circuit including the first and second batteries in series with each other and a second load device in parallel with the series connection of said batteries and adapted to be powered by electricity at a voltage in a second voltage range corresponding to the sum of the rated voltages of said batteries,
    a first regulating means for regulating the voltage across said first load circuit,
    a second regulating means for regulating the voltage across said second load circuit,
    and control means responsive to an increase in the voltage across said first load circuit to a value above said first voltage range for causing the second regulating means to decrease the voltage across said second load circuit.

2. The invention as defined in claim 1 wherein:
    said first regulating means is coupled with said output of said DC generator and with said first load circuit for regulating the voltage across said first load circuit, and said second regulating means controls said generator for regulating the voltage across said second load circuit.

3. The invention as defined in claim 1 wherein:

said control means controls said second regulating means.

4. The invention as defined in claim 3 wherein:

said first regulating means is coupled with said output of said DC generator and with said first load circuit for regulating the voltage across said first load circuit.

5. The invention as defined in claim 4 wherein said first regulating means comprises switching means and an inductor connected in series between the output of said generator and said first load circuit, and unidirectional conductive means connected across the series combination of said inductor and said first load circuit, and means for controlling said switching means.

6. The invention as defined in claim 5 including means connected with said first load circuit for limiting transient voltages applied thereto.

7. The invention as defined in claim 1 including means connected with said first load circuit for limiting transient voltages applied thereto.

* * * * *